United States Patent [19]

Takahashi et al.

[11] Patent Number: 4,561,774
[45] Date of Patent: Dec. 31, 1985

[54] ORIGINAL PLATE SCANNING DEVICE

[75] Inventors: Toshikatsu Takahashi; Nobuo Murata, both of Kanagawa, Japan

[73] Assignee: Fuji Xerox Co., Ltd., Tokyo, Japan

[21] Appl. No.: 736,398

[22] Filed: May 20, 1985

Related U.S. Application Data

[63] Continuation of Ser. No. 459,075, Jan. 19, 1983, abandoned.

[30] Foreign Application Priority Data

Jan. 22, 1982 [JP] Japan ................................. 57-8543

[51] Int. Cl.⁴ .............................................. G03B 27/62
[52] U.S. Cl. ..................................... 355/75; 308/4 R; 188/268
[58] Field of Search ................... 355/8, 11, 50, 51, 53, 355/54, 75; 308/3 R-3 A, 5 R, 3.5, 4 R; 188/268

[56] References Cited

U.S. PATENT DOCUMENTS

| | | | |
|---|---|---|---|
| 3,330,605 | 7/1967 | Jasmand | 308/3.5 |
| 3,637,303 | 1/1972 | Komori et al. | 355/8 |
| 3,990,792 | 11/1976 | Kono et al. | 355/51 |

Primary Examiner—L. T. Hix
Assistant Examiner—Brian W. Brown
Attorney, Agent, or Firm—Sughrue, Mion, Zinn, Macpeak & Seas

[57] ABSTRACT

An original plate scanning device for a microfilm copying machine has a guide stand and bearings for supporting a straight shaft member which extends parallel with said guide shaft and is movable linearly relative to the bearing. A semi-solid state lubricant which has an unworked penetration between 200 and 230 is disposed in the bearing for providing a braking force to the moving, straight shaft member.

10 Claims, 7 Drawing Figures

4,561,774

ORIGINAL PLATE SCANNING DEVICE

This is a continuation application of application Ser. No. 459,075, filed Jan. 19, 1983, and now abandoned.

BACKGROUND OF THE INVENTION

1. Field of the Invention

The present invention relates to a device for scanning the original plate of a microfilm copying machine on which an aperture card is loaded.

2. Description of the Prior Art

An original plate scanning device for a microfilm copying machine must carry out a scanning operation at a constant speed which corresponds to the speed of rotation of a photo-sensitive member and to the projection magnification. In other words, when the required scanning speed is different from the average or DC speed component of the actual speed, or when the actual speed includes an AC component (namely, a slight variation), an accurate, high resolution copying operation cannot be achieved.

It is technically possible to allow the average speed component of the actual speed, which is one of the factors lowering the resolution, to approach the necessary speed; however, the conventional means for reducing the AC component of actual speed (i.e., the slight variation) is poor in performance and high in cost.

More specifically, the slight variation of the actual speed is attributable to the drive section of the scanning device, or to the vibration of the copying machine body which is transmitted to the scanning device. In order to reduce the speed variation, the following conventional means is employed by making reference to FIG. 1: A brake device is provided on the drive side of the scanning device so that a brake surface 16 is formed on a drive shaft 14 which drives wire means 12. The wire means 12 can be a drive steel tape or a wire rope which is fastened to one end of an original plate 10. A brake pad 20 of a brake bracket 18 is elastically biased to press against the brake surface.

Alternatively, referring to FIG. 2, a brake device has a leaf spring 26 which is held by a bracket 24 and secured to an original plate 10, and the leaf spring thus held pushes a brake pad 28 against a guide shaft 22 which is adapted to guide the original plate 10.

In yet a further prior art device, a commercially available torque damper is added to the drive shaft 14 of the scanning device. However, in the case in which the brake is provided on the drive or driven side, it is difficult to generate a constant brake force and to maintain it. Even when it is possible to do so, the adjustment is considerably troublesome, and, when it is intended to make the adjustment simple, the brake device becomes expensive. Similarly, the torque damper is also relatively expensive.

SUMMARY OF THE INVENTION

Accordingly, an object of the present invention is to provide an original plate scanning device which has a means for effectively reducing the slight variation of the actual scanning speed (i.e., its AC component) which is relatively inexpensive.

The apparatus of the present invention comprises: a straight shaft member which extends parallel with a guide stand; and a bearing which receives the shaft member so that it can move linearly relative to the bearing, the bearing having a semi-solid state lubricant which has an unworked penetration between 200 and 230 sealed around the shaft member. (Unworked penetration is an ASTM Standard for a method of measuring the consistency of lubricating greases and is defined as "the penetration at 77 F. (25 C.) of a sample of lubricating grease which has received only minimum disturbance in transfer from the sample can to a grease-worker cup or dimensionally equivalent container".) Either the shaft member or the bearing is secured to an original plate, while the other is secured to a microfilm copying machine body. In one embodiment of the present invention, the semi-solid state lubricant is grease; however, other materials may be employed.

The semi-solid state lubricant is sealed between the shaft member and the bearing so that the shaft member is supported by the bearing. Therefore, the semi-solid state lubricant acts as a suitable and stable braking means and damps vibration from the copying machine body. As a result, the actual scanning speed can be set as required, and the AC component can be effectively reduced. Since this effect is provided by the shaft member and the bearing which is sealed with the semi-solid state lubricant, the number of components of the device is small. Accordingly, the device can be manufactured inexpensively when compared with a conventional original plate scanning device.

The braking effect and the vibration damping effect are provided by the semi-solid state lubricant, and, accordingly, no adjustment is required. Furthermore, the semi-solid state lubricant does not wear and change with time; that is, the semi-solid state lubricant is much more stable in performance than the conventional mechanical braking member.

A suitable unworked penetration of the semi-solid state lubricant depends on the diameter or circumferential length of the shaft member and the axial length of the lubricant-filled region in the bearing, i.e., the quantity of semi-solid state lubricant which is sealed in the bearing. However, it should be noted that best results are obtained when the unworked penetration is between 200 and 230. When the unworked penetration is less than 200, the braking force is large, and a large drive torque is required. When the unworked penetration is larger than 230, the braking force is insufficient.

DESCRIPTION OF THE PREFERRED EMBODIMENTS

Figure 1:
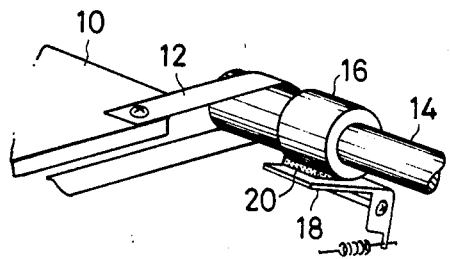
FIGS. 1 and 2 are diagrams showing conventional original plate scanning devices.
Figure 2:
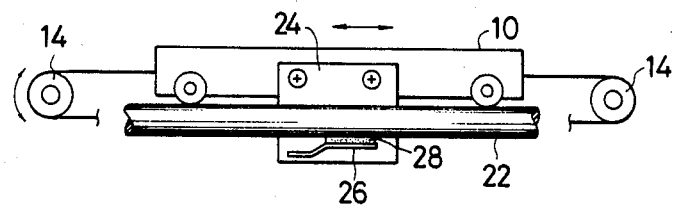
Figure 3:
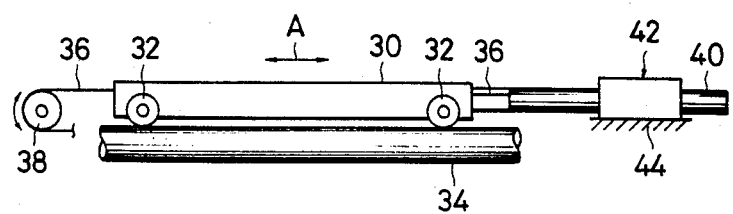
FIG. 3 is a plan view showing an original plate scanning device constructed according to one embodiment of the present invention.

As shown in FIG. 3, an original plate 30 is placed through rollers 32 on a guide shaft 34. Wire ropes 36 are fastened to both ends of the original plate and are driven in the direction of arrows A or reciprocated through rotary shafts 38 (only one being shown) by a drive device (not shown). A shaft member 40 is secured to one end of an original plate 30 so that it extends parallel to a guide shaft 34. The shaft member 40 is supported by a bearing 42 which is secured to a microfilm copying machine body 44.

Figure 4:
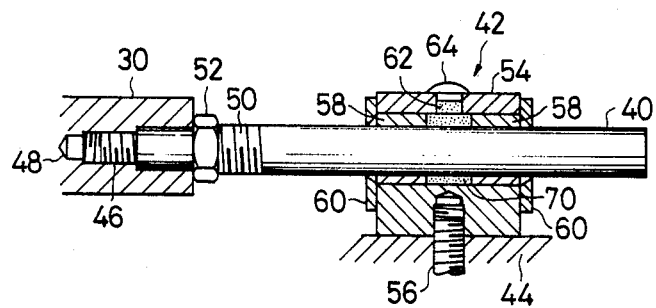
FIG. 4 is a sectional view of FIG. 3 showing a shaft member and its bearing.

As shown in FIG. 4, one end portion of the shaft member 40 contains threads 46 which are screwed into an engaging hole 48 which is formed in one end portion of the original plate 30. Another threaded portion 50, which is closer to a central portion of the shaft member 40, is provided on the shaft member 40 so that a nut 52 can be tightened on the threaded portion 50. The original plate 30 and the shaft member 40 can be fixedly and pressingly secured by tightening the nut 52.

The bearing 42 has a bearing block 54 which is fixedly secured to the copying machine body 44 with a screw 56. A pair of bearing members 58 are press-fitted into a through hole which is formed in the bearing block 54. Dust-proof plates 60, which serve as retaining plates, are mounted on both ends of the bearing block 54 in order to prevent the entrance of dust into the bearing block 54. The shaft member 40 is inserted into the bearing members 58 and is supported by the bearing member in such a manner that the shaft member 40 can reciprocate. The bearing block 54 contains an injecting hole 62 through which grease 70 is injected into the space between the bearing members 58, and a cover 64 is fitted onto the injecting hole 62.

In operation, as the original plate 30 is scanned along the guide shaft 34, the shaft member slides in the bearing 42. During this time, the grease 70 in the bearing 42 provides a brake force which absorbs vibrations from the copying machine body 44, thus reducing the amount of vibration which is transmitted to the original plate 30. Accordingly, the motion of the original plate 30 is made smoother by the braking force which is generated by the grease 70.

In the above-described embodiment, the braking and motion smoothing effects were best when grease of an unworked penetration on the order of about 230 was injected into the bearing. The vibration controlling or damping characteristics can be changed by changing the distance between the bearing members 58 or by changing the circumferential length of the shaft member 40, which changes the amount of grease contained in the bearing 42, as well as the contact surface area between the grease 70 and the shaft member 40. The vibration damping effect is improved by decreasing the unworked penetration of the grease; however, the drive torque of the original plate becomes larger as the unworked penetration of the grease is decreased. Thus, it has been found that optimum results are achieved when the unworked penetration of the grease is approximately between 200 and 230.

Figure 5:
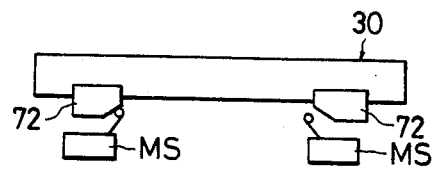
FIG. 5 is a diagram showing a conventional arrangement of microswitches for controlling an original plate.
Figure 6:
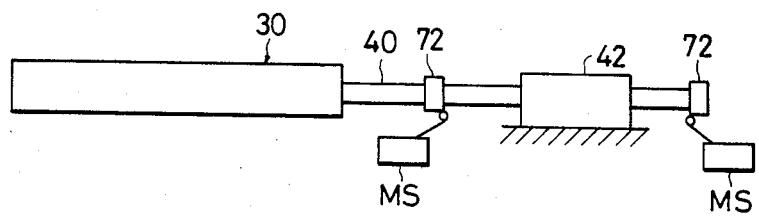
FIG. 6 is a diagram showing an arrangement of an original plate controlling microswitch in the first embodiment of the invention shown in FIG. 3.
Figure 7:
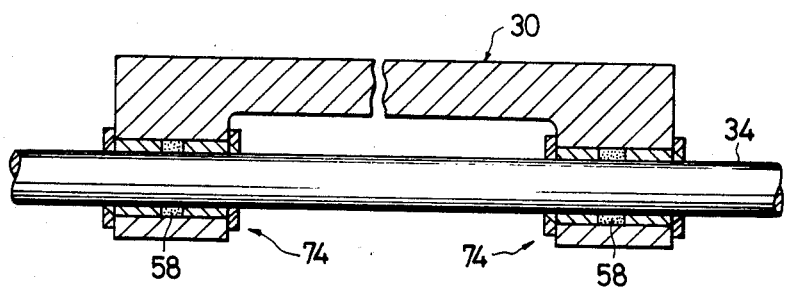
FIG. 7 is an explanatory diagram, partly in section, showing another embodiment of the present invention.

In order to control the reciprocation of the original plate, microswitches are extensively employed. Heretofore, strikers 72 were mounted directly on the original stand 30, as shown in FIG. 5 for operating microswitches MS. This method is disadvantageous because the construction of the original plate is intricate, and also it is rather difficult to adjust the position of the strikers. However, if the strikers 72 are provided on the shaft member 40, as shown in FIG. 6, they can be disposed on both sides of the bearing 42 so that the construction of the original plate can be made simple. Furthermore, the position of the strikers can readily be adjusted by employing threaded strikers. Accordingly, significant advantages can be obtained when it is the shaft member 40 rather than the bearing which is connected to the original plate. On the other hand, when the original plate 30 is supported by the guide shaft 34 through plain bearings 74, as shown in FIG. 7 (unlike the case in which the original plate 30 is set through the rollers 32 on the guide shaft 34, as shown in FIG. 3), the guide shaft 34 may be used as the shaft member 40, and each plain bearing 74 is formed like the bearing 42 shown in FIG. 3 so that the grease 58 is sealed in the bearing.

As is apparent from the above description, the original plate scanning device of the invention comprises: the straight shaft member which is extended in parallel with the guide stand, and the bearing which receives the shaft member in such a manner that the shaft member is movable reciprocally relative to the bearing. The bearing has a semi-solid state lubricant which has a an unworked penetration between 200 and 230, sealed around the shaft member. In this device, either the shaft member or the bearing is secured to the original plate, while the other is secured to the microfilm copying machine body. Therefore, the semi-solid state lubricant acts as a braking agent and effectively absorbs the vibrations from the copying machine body to eliminate effectively the slight variation of scanning speed, namely, the AC component.

We claim:

1. An original plate scanning device for a microfilm copying machine, comprising:
   a guide stand;
   a straight shaft member which extends parallel with said guide stand;
   a bearing for supporting said shaft member, said shaft member being movable linearly relative to said bearing; and
   a semi-solid state lubricant sealed around said shaft member and having an unworked penetration between 200 and 230, one of said shaft member or said bearing being secured to an original plate, with the other being secured to a microfilm copying machine body, said lubricant functioning as a brake and damping mechanism on the shaft for maintaining constant the speed of the linear movement of said shaft member and for absorbing vibrations from said copying machine body.

2. The scanning device as claimed in claim 1 wherein said shaft member is secured to said original plate and said bearing is secured to said microfilm copying machine body.

3. The scanning device as claimed in claim 1 wherein said bearing is secured to said original plate and said shaft member is secured to said microfilm copying machine body.

4. The scanning device as claimed in claim 1 further comprising rollers for supporting said original plate on said guide stand.

5. The scanning device as claimed in claim 4 further comprising wire ropes fastened to both ends of said original plate, and rotating shafts for driving said wire ropes.

6. An original plate scanning device for a microfilm copying machine, comprising:
   a guide stand;
   a straight shaft member which extends parallel with said guide stand;
   a bearing for supporting said shaft member, said shaft member being movable linearly relative to said bearing; and a semi-solid state lubricant sealed around said shaft member and having an unworked penetration between 200 and 230, one of said shaft member or said bearing being secured to an original plate, with the other being secured to a microfilm copying machine body, said lubricant functioning as a brake and damping mechanism on the shaft for maintaining constant the speed of the linear movement of said shaft member; and wherein said shaft member has first and second threaded portions and an end of said original plate has an engaging hole, said first threaded portion being screwed into said engaging hole and a nut being tightened on said second threaded portion to secure said shaft member to said original plate.

7. The scanning device as claimed in claim 1 wherein said bearing comprises:

a screw;

a bearing block fixedly secured to said copying machine body by said screw, said bearing block having a through hole therein;

a pair of bearing bushes press fitted into said bearing block through hole; and a pair of plates mounted on opposite ends of said bearing block to prevent dust from entering said bearing block, said shaft member being inserted into said bearing members and being supported thereby so that said shaft member can move and reciprocate relative to said bearing members.

8. The scanning device claimed in claim 7 wherein said bearing block has an injection hole, said lubricant being injected into a space between said bearing members, said bearing further comprising a cover fitted onto said injection hole.

9. The scanning device as claimed in claim 1 further comprising strikers threadably disposed on said shaft member so as to be on opposite sides of said bearing, said strikers activating microswitches.

10. The scanning device as claimed in claim 1 wherein said semi-solid state lubricant comprises grease.

* * * * *